Figure 1:
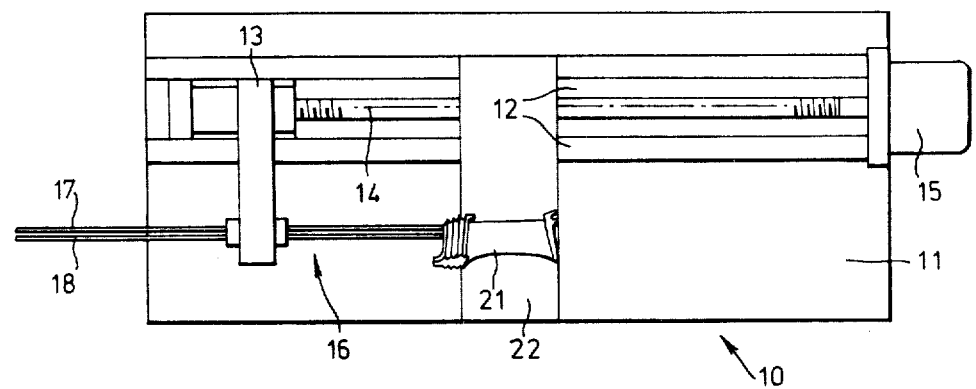

United States Patent [19]

Osman et al.

[11] 4,198,852
[45] Apr. 22, 1980

[54] INSPECTION APPARATUS

[75] Inventors: John M. Osman, Bristol; Michael P. Martin, Berkshire, both of England

[73] Assignee: Rolls-Royce Limited, London, England

[21] Appl. No.: 959,476

[22] Filed: Nov. 13, 1978

[30] Foreign Application Priority Data

Nov. 29, 1977 [GB] United Kingdom ............... 49534/77

[51] Int. Cl.² ............................................. G01M 3/02
[52] U.S. Cl. .............................. 73/37; 33/DIG. 2
[58] Field of Search ............... 73/37, 37.7, 37.6, 37.5, 73/159, 156, 157; 33/DIG. 2

[56] References Cited

U.S. PATENT DOCUMENTS

| | | | |
|---|---|---|---|
| 2,794,444 | 6/1957 | Markey | 73/37.7 X |
| 2,884,495 | 4/1959 | Frankel | 73/37.7 X |
| 3,340,886 | 9/1967 | Jacobsen | 73/37.7 X |
| 3,405,552 | 10/1968 | Luckett | 73/37.7 |

*Primary Examiner*—Gerald Goldberg
*Assistant Examiner*—Joseph W. Roskos
*Attorney, Agent, or Firm*—Stevens, Davis, Miller & Mosher

[57] ABSTRACT

Apparatus suitable for inspecting the positional accuracy of a hole or passage in a workpiece comprising workpiece support means and a probe assembly. The probe assembly comprises two parallel tubes; one provided with a thermistor bead maintained at a temperature higher than ambient and the other provided with a nozzle adapted so as to direct a jet of air on to the thermistor bead. The tubes are positioned on each side of a workpiece to be inspected so that as the tubes are traversed across the workpiece, the jet of air is prevented from impinging upon the thermistor bead. However when a hole or passage in the workpiece is spanned by the nozzle and thermistor bead, the air jet will impinge upon the thermistor bead, thereby cooling it and hence providing a signal that a hole or passage has been encountered.

6 Claims, 4 Drawing Figures

INSPECTION APPARATUS

This invention relates to inspection apparatus.

It is becoming increasingly common in the field of gas turbine propulsion engines to provide the turbines of such engines with aerofoil blades which are air cooled. Usually such blades are provided with internal passages which are adapted to be fed with pressurized cooling air. In one particular case an aerofoil blade is provided with two interlinked parallel cooling air passages which are positioned adjacent the blade leading edge. The short passages interlinking the two parallel passages are particularly inaccessible and consequently difficult to inspect for positional accuracy.

It is an object of the present invention to provide inspection apparatus which is capable of inspecting the positional accuracy of such interlinking passages.

According to the present invention, apparatus suitable for inspecting the positional accuracy of a hole or passage in a workpiece comprises workpiece support means and a probe assembly comprising means responsive to the impingement of a jet of fluid thereon and means adapted to direct a jet of fluid on to said fluid jet responsive means, said fluid jet directing means and said fluid jet responsive means being aligned and spaced apart, and said workpiece support means and said probe assembly being mounted for relative movement so that said fluid jet directing means and said fluid jet responsive means are positionable at each end of the hole or passage to be inspected whereupon a fluid jet from said fluid jet directing means passing through said hole or passage impinges upon said fluid jet responsive means, means being provided to indicate the relative positions of said workpiece support means and said probe assembly whereby the position of said hole or passage may be determined when said fluid jet responsive means indicates the impingement of a fluid jet thereon.

Said fluid is preferably air.

Said fluid jet responsive means may be a thermistor bead.

Said thermistor bead is preferably maintained at a temperature higher than that of the ambient atmosphere.

Said jet of air is preferably at ambient temperature.

Said probe assembly is preferably movable relative to said workpiece support means.

Said fluid jet responsive means and said fluid jet directing means may be mounted on a common support member.

Alternatively said fluid jet responsive means and said fluid jet directing means may be mounted on independent support members adapted to move in unison relative to said workpiece support means.

Figure 2:
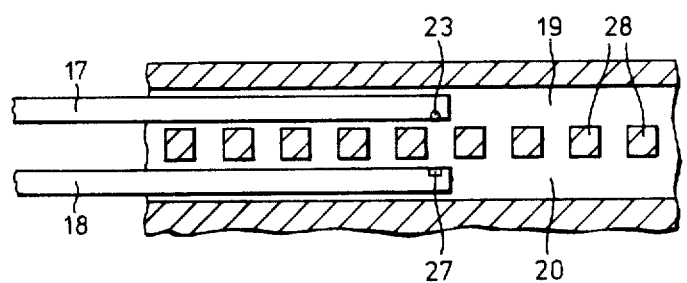
Figure 3:
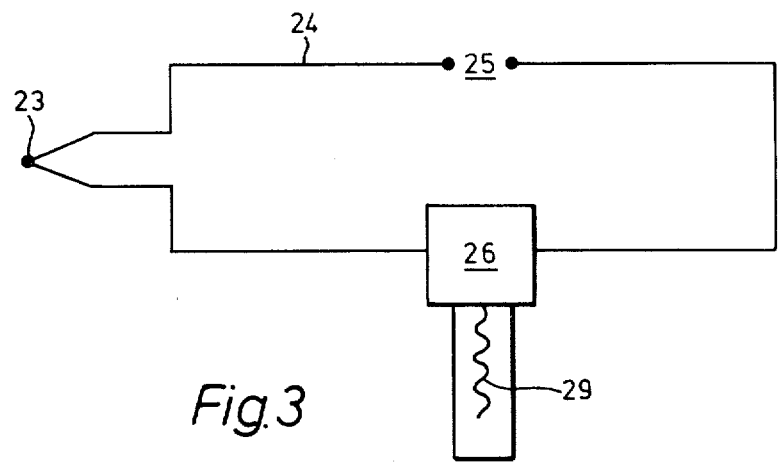
Figure 4:
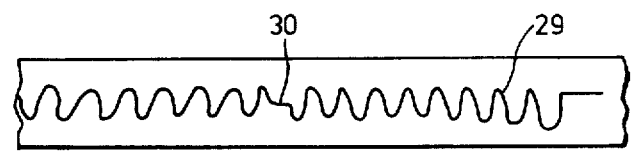

The invention will now be described, by way of example, with reference to the accompanying drawings in which:

FIG. 1 is a plan view of an inspection apparatus in accordance with the present invention, inspecting the interior cooling passages of an aerofoil blade for a gas turbine engine, FIG. 2 is an enlarged sectional view of a portion of the aerofoil blade shown in FIG. 1 showing part of the probe assembly of the inspection apparatus in accordance with the present invention, FIG. 3 is a diagrammatic representation of the electrical circuitry associated with the inspection apparatus shown in FIG. 1, and FIG. 4 is a representation of a typical read-out from the electrical circuitry shown in FIG. 3.

With reference to FIG. 1, an inspection apparatus generally indicated at 10 comprises a bed 11 having a track 12 along which a carriage 13 is driven by a leadscrew 14. The leadscrew 14 is driven in turn by a stepping motor 15. The carriage 13 is provided with a probe assembly 16 comprising two thin tubes 17 and 18 which are mounted so as to be parallel. The tubes 17 and 18 are of such a thickness that they are able to pass into parallel cooling passages 19 and 20 respectively provided in the leading edge of a gas turbine engine turbine blade 21. The aerofoil blade 21 is statically positioned on a workpiece support member provided on the bed 11.

The end of the tube 17 which passes into the cooling passage 19 is provided with a thermistor bead 23. The thermistor bead 23 is part of a simple loop circuit 24 which can be seen in FIG. 3. The circuit 24 also includes a constant voltage source 25 and a conventional current measuring pen recorder 26.

The thermistor bead 23 operates in the conventional way. Thus a constant voltage is applied to the thermistor bead 23 so as to heat it up to a temperature of approximately 70° C. Any change in the temperature of the thermistor bead 23 results in a corresponding change in its electrical resistance, which change is monitored by the pen recorder 26.

The end of the tube 18 which passes into the cooling passage 20 is provided with a nozzle 27 which is aligned with the thermistor bead 23. The arrangement is such that if pressurized air at room temperature is passed through the tube 18, a jet of air is directed on to the termistor bead 23. Thus if the space between the thermistor bead 23 and the nozzle 27 is unimpeded, the thermistor bead 23 will be cooled down, thereby altering its electrical resistance.

The cooling passages 19 and 20 in the aerofoil blade 21 are interlinked by a series of short parallel passages 28. In order to check the positional accuracy of these passages 28 after blade manufacture, the tubes 17 and 18 are driven through the passages 19 and 20 at constant rate by the stepping motor 15. As the tubes 17 and 18 progress through the passages 19 and 20, the termistor bead 23 is alternately exposed and shielded from the jet of air from the nozzle 27. This results in a corresponding alternation in the resistance of the thermistor head 23 which is indicated visually by a sine wave trace 29 output from the pen recorder 26. The stepping motor 15 and the motor chart drive of the pen recorder 26 are driven at a constant rate so that the distances between the peaks of the sine wave 29 are directly proportional to the distances between the passages 28.

As well as determining the positional accuracy of the passages 28, the inspection apparatus 10 may be used to determine whether any of the passages 28 are either partially or fully blocked. Thus a blockage will be indicated by either a sine wave of reduced amplitude or the complete absence of a wave as is indicated at 30. Moreover, the amplitude of the sine wave 29 may be used to calculate the actual cross-sectional area of the passages 28.

In the embodiment described above, the aerofoil blade 21 is one having parallel cooling passages 19 and 20 which are both accessible from the same direction. It sometimes happens, however, that such cooling passages are only accessible from opposite directions. If this is the case, then the inspection apparatus 10 may be provided with two carriages 13 driven by two separate stepping motors 15. One carriage 13 would be provided with a tube 17 carrying the thermistor bead 23 whilst the other would be provided with the nozzle 27. The two tubes 17 and 18 could then enter the aerofoil blade 21 from opposite directions until the thermistor bead 23 and nozzle 27 are aligned. Both tubes 17 and 18 could then travel along the cooling passages 19 and 20 in unison whilst this alignment is maintained by a suitable control system associated with the stepping motors 15.

Although the present invention has been described with reference to a thermistor cooled by a jet of air at ambient temperature, other arrangements could be utilized. Thus for instance, the jet could be of any other suitable fluid, hot or cold, which the thermistor bead 23 is capable of reacting to. Moreover the thermistor bead 23 could be replaced by any other suitable means which is responsive to a jet of fluid.

We claim:

1. Apparatus suitable for inspecting the positional accuracy of a hole or passage in a workpiece support means and a probe assembly comprising a thermistor bead responsive to the impingement of a jet of air thereon and means adapted to direct a jet of air on to said thermistor head, said air jet directing means and said thermistor bead being aligned and spaced apart, and said workpiece support means and said probe assembly being mounted for relative movement so that said air jet directing means and said thermistor bead are positionable at each end of the hole or passage to be inspected whereupon an air jet from said air jet directing means passing through said hole or passage impinges upon said thermistor bead, means being provided to indicate the relative positions of said workpiece support means and said probe assembly whereby the position of said hole or passage may be determined when the thermistor bead indicates the impingement of an air jet thereon.

2. Apparatus suitable for inspecting the positional accuracy of a hole or passage in a workpiece as claimed in claim 1 wherein said thermistor bead is maintained at a temperature higher than that of the ambient atmosphere.

3. Apparatus suitable for inspecting the positional accuracy of a hole or passage in a workpiece as claimed in claim 1 wherein said jet of air is at ambient temperature.

4. Apparatus suitable for inspecting the positional accuracy of a hole or passage in a workpiece as claimed in claim 1 wherein said probe assembly is movable relative to said workpiece support means.

5. Apparatus suitable for inspecting the positional accuracy of a hole or passage in a workpiece as claimed in claim 1 wherein said thermistor bead and said air jet directing means are mounted on a common support member.

6. Apparatus suitable for inspecting the positional accuracy of a hole or passage in a workpiece as claimed in claim 1 wherein said thermistor bead said air jet directing means are mounted on independent support members adapted to move in unison relative to said workpiece support means.

* * * * *